March 7, 1967

J. B. GRIFFO 3,307,396

FLUID FLOW MEASURING DEVICE

Filed Feb. 28, 1964

INVENTOR.
JOSEPH B. GRIFFO

BY
*Brumbaugh, Free, Graves & Donohue* his ATTORNEYS

INVENTOR.
JOSEPH B. GRIFFO
BY
Brumbaugh, Free, Graves & Donohue
his ATTORNEYS

United States Patent Office 3,307,396
Patented Mar. 7, 1967

3,307,396
FLUID FLOW MEASURING DEVICE
Joseph B. Griffo, Woodstock, N.Y., assignor to Rotron Manufacturing Company, Inc., Woodstock, N.Y., a corporation of New York
Filed Feb. 28, 1964, Ser. No. 348,166
5 Claims. (Cl. 73—231)

The present invention relates to fluid metering arrangements, and more particularly to methods and apparatus for measuring the rate of flow of fluid.

In many industrial applications, it is necessary or desirable to determine the amount of fluid delivered at a particular point in terms of its weight or mass, which, of course, depends on the density of the fluid, or in terms of volume flowing past the measurement point. Where the fluid density is known to be constant, or to vary in a predetermined manner, the mass flow rate can be calculated simply by multiplying the volumetric rate of flow by the density. However, in may cases, the density of the fluid being delivered is not known beforehand and if accurate metering is to be achieved, must be continuously monitored. This is especially true in connection with volatile liquids such as hydrocarbons, where the fluid may be an unpredictable and continuously varying mixture of liquid and gas, or where the fluid being delivered may absorb unknown quantities of gases prior to delivery.

Prior art techniques and apparatuses for determining either mass or volumetric flow rates have been rather complex in nature and/or of such character as to substantially affect the pressure in the delivery line. It is, accordingly, the principal object of the present invention to provide improved flow rate measuring techniques and apparatus of great simplicity and accuracy compared with those already known.

A further object of the present invention is to provide novel mass flow rate measuring techniques and apparatus in which the density of the flowing fluid is continuously monitored, whereby the measurement is continuously sensitive to changes in fluid density.

Still another object of the present invention is to provide apparatus for measuring the mass and/or volumetric flow rate of fluid in a conduit employing a minimum number of moving elements, and which enables accurate measurements to be obtained with a minimum of maintenance and operator attention.

An additional object of the present invention is to provide novel techniques and apparatus for measurement of fluid flow which with but minor modification can be use to measure either the mass or volumetric rate of flow.

In accordance with the present invention, a characteristic of vortex fluid flow is utilized to provide a continuous indication proportional to both density and fluid velocity. Specifically, the pressure drop across a vortex, i.e., between its axis and outer periphery, which is proportional to the density and velocity of the fluid forming the vortex, is measured to obtain this indication. This is then combined with a measurement proportional to fluid velocity to provide the mass flow rate. If independent density monitoring means are available, the volumetric rate of flow may be obtained as well.

The vortex is induced from the longitudinal flow through a section of conduit interposed in the fluid flow path by means of helical vane means fixedly secured in the section. In one embodiment, the angular flow thus induced, in addition to creating the vortex which provides the density indication, also operates a rotatable vane type of fluid velocity indicator to provide the velocity indication. In another embodiment, the velocity is obtained with any conventional type of measuring arrangement. Simple computation means are also provided for combining the two measurements to provide the mass flow rate quantity. Alternatively, the final calculation may be made by the observer.

The latter embodiment may also be used to provide a volumetric flow rate measurement by combining an independently obtained density measurement with the pressure drop across the vortex.

The foregoing and other objects, features, and advantages of the present invention will become more readily apparent from the following detailed description thereof, when taken in conjunction with the accompanying drawings in which.

Figure 1:
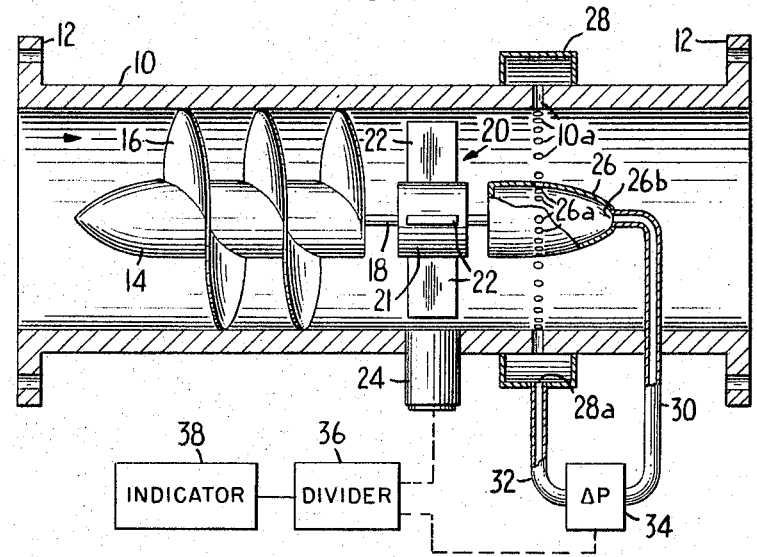
FIGURE 1 is a partial cross section through one form of apparatus in accordance with the invention.

Referring now to FIGURE 1, the measuring apparatus of the invention is shown as including a conduit section 10 provided with flanges 12 at each end thereof which are adapted to be bolted or otherwise fastened to the preceding and succeeding sections of conduit in the fluid flow line. The internal cross-sectional area of the conduit section 10 is substantially uniform over its entire length.

Disposed within and along the axis of the conduit section 10 is a hub element 14, on the peripheral surface of which is secured a helical vane member 16. The latter preferably is in contact with the inner wall of the conduit section 10 over substantially its entire length and is welded or otherwise secured thereto to maintain the hub 14 and vane 16 fixed against fluid flow. The hub element and helical vane member may be separately formed and assembled, or fabricated as an integral unit, such as by machining. Although for ease of illustration a single vane 16 is shown, it will be understood that a plurality of such vanes interleaved with each other may be provided, as in FIGURE 3. Accordingly, as used herein the term helical vane member or means is intended to encompass one or more separate curved elements.

The hub element 14 is formed at its upstream end to present a streamline surface to the fluid flow entering the conduit section 10 in the direction of the arrow. The pitch of the vane member 16 is such that a substantial component of velocity in the radial direction is induced in the flowing fluid. The resulting rotational flow generates a vortex at the downstream end of the vane member.

On a shaft 18 secured at the downstream end of the hub 14 and disposed coaxially with the conduit section 10, is mounted a velocity sensing rotor 20. The latter is freely mounted for rotation about the shaft 18 and includes a plurality of vane members 22 extending radially therefrom. Four such vanes are shown in the drawing but any number may be used as desired. As will be readily understood, the vane rotor structure is rotated in accordance with the angular velocity imparted to the fluid by the helical member 16. Preferably, the rotor structure 20 is made of a lightweight material, such as aluminum, such that it requires a minimum amount of force to be set into rotation.

The vaned rotor 20 cooperates with a sensing device 24 mounted in the well of the conduit section 10 adjacent the rotor structure to provide an indication of the angular velocity of the fluid which is in turn proportional to the linear velocity of the fluid flow in the conduit. In accordance with one well known form of such velocity sensor, the device 24 may be a magnetic circuit responsive to magnetic elements mounted in the rotor blades 22, whereby passage of each blade past the sensing device 24 produces an electrical impulse. Other types of similar devices are known in the art and may be used as convenient. The output of the device 24, in the form of an electrical signal or mechanical shaft displacement, for example, is indicative of the speed of rotation of the rotor 20, which is proportional to the velocity of the longitudinal flow of fluid into the conduit section 10.

At the downstream end of the shaft 18 is mounted a hollow, bullet-shaped element 26 provided with a plurality of apertures 26a arranged circumferentially therearound. The apertures 26a provide fluid access to the interior of the element 26. An additional aperture 26b is provided at the extreme end of the element.

The conduit section 10 is similarly provided with a plurality of circumferentially spaced apertures 10a through its wall, which apertures lie in the same plane as the apertures 26a. A fluid-tight annular chamber is formed completely around the exterior surface of the conduit 10 over the outer ends of the apertures 10a by means of channel member 28. The apertures 10a permit fluid access to the interior of the channel.

A pair of small diameter tubes 30 and 32 respectively couple the aperture 26b in the end of the element 26 and an aperture 28a in the annular channel to a differential pressure measuring device 34. In its simplest form, the latter may be a manometer, but perferably is any of the well known pressure difference measuring devices providing an output in the form of an electrical signal or mechanical shaft displacement. The pressure differential detector 34 indicates the difference in pressure across the vortex created by the helical vane member 16.

The outputs of the velocity detector 24 and the pressure differential detector 34 are coupled to the inputs of a dividing arrangement 36, with the $\Delta P$ measurement being the dividend and the velocity being the divisor. The quotient, which is proportional to the mass flow rate, is supplied to actuate an indicator 38 of any suitable form.

If the outputs of the devices 24 and 34 are in the form of mechanical shaft displacements, for example, the divider 36 may be in the form of a suitable gear arrangement. Alternatively, if electrical outputs are developed, the divider 36 may be one of a number of known electrical dividing networks.

Mass flow rate is defined as the mass of fluid flowing past a point in a unit of time, for example, pounds per second. If the volumetric rate of flow is known, it may simply be multiplied by fluid density to give the mass flow rate. Assuming a constant cross-sectional area, the volumetric rate of flow may be expressed as a constant times the linear velocity of the fluid flow. Thus, mass flow rate may be given in terms of density D and velocity V in the following form:

$$\text{Mass flow rate} = KDV \quad (1)$$

Operation of the apparatus of FIGURE 1 may now be explained as follows. As the longitudinally flowing fluid enters the conduit section 10, the helical vane member 16 imparts to it an angular velocity $\omega$. This quantity is related to the linear velocity V of the fluid flow by the expression:

$$\omega = K_1 V \quad (2)$$

which may also be expressed (by transposing quantities) as:

$$V = \frac{1}{K_1}\omega \quad (3)$$

or:

$$V = K_2 \omega \quad (4)$$

where the constants $K_1$ and $K_2$ are functions of the cross-sectional area of the conduit section and the pitch of the helical vane member, both of which remain unchanged.

The difference in pressure, $\Delta P$, measured at 34 is related to the density D of the fluid flowing through the conduit and the angular velocity of the vortex created by the helical vane member in accordance with the expression:

$$\Delta P = K_3 D \omega^2 \quad (5)$$

where $K_3$ is a constant which is a function of the cross-sectional area of the conduit section.

If we now divide expression (5) for $\Delta P$ by expression (4) for linear velocity V, we obtain the following:

$$\frac{\Delta P}{V} = \frac{K_3 D \omega^2}{K_2 \omega} = K_4 D \omega \quad (6)$$

Substituting expression (2) for $\omega$, and lumping constants, the equation reduces to:

$$KDV \quad (7)$$

which is the mass flow rate of expression (1) above. As will be apparent from dimensional analysis, the latter expression will be in the terms of mass per unit time, e.g., pounds per second, which is the desired resultant. Thus, dividing the $\Delta P$ measurement by the quantity proportional to velocity provides a result directly proportional to mass flow rate and the indicator 38 may be calibrated to read directly in terms of mass per unit time. If needed, separate indications of the linear velocity and pressure difference may be provided as well.

Figure 2:
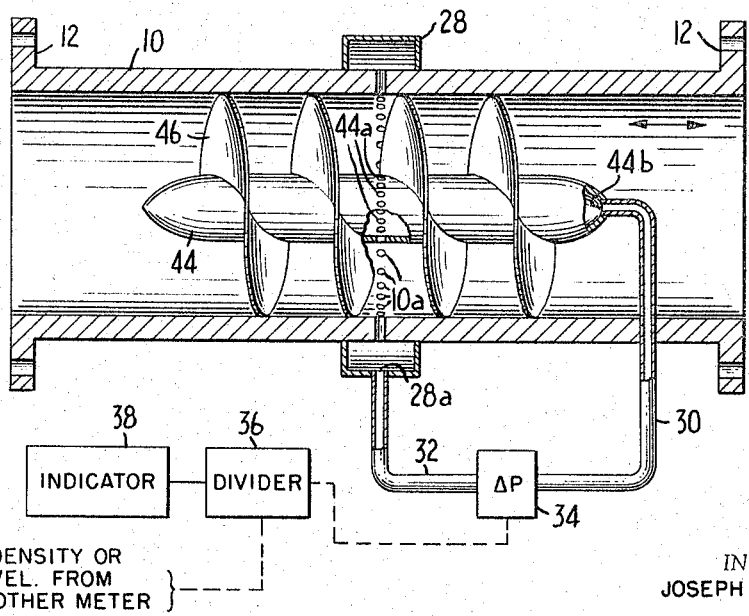
FIGURE 2 is a partial cross section through a somewhat modified form of apparatus operating in accordance with the invention.

In fluid flow systems where the fluid velocity has already been determined, mass flow rate can be obtained in accordance with the modification of FIGURE 2. As seen, the structure comprises an elongated hub element 44 on the outer surface of which is secured a helical vane member 46, similar to the vane member 16 of FIGURE 1. The hub 44 however, is hollow and includes near its mid-portion a plurality of circumferentially spaced apertures 44a. An aperture 44b is also provided at one end thereof.

The circumferentially spaced apertures 10a in the conduit 10 are located in the plane of the apertures 44a and are enclosed by the channel 28. Conduits 30 and 32 connect the apertures 44b and 28a respectively to the $\Delta P$ measuring device 34.

As described in connection with FIGURE 1, the helical vane member 46 converts longitudinal flow in the conduit section 10 to vortex flow, the pressure drop across which is measured in the device 34. This measurement, along with the measurement of velocity from the external meter, is applied to the input of divider 36 to provide the mass flow rate indication at 38. As indicated by the arrow in FIGURE 2, the apparatus will create a vortex and provide a $\Delta P$ measurement regardless of the direction of flow into the conduit section 10.

The configuration of FIGURE 2 may also be used to provide an indication of the volumetric rate of flow of fluid in the conduit, if a density indication is available from an independent measuring device such as a densitometer. As indicated in the drawing, the density measurement is supplied to the divider 36 to provide the volumetric rate of flow, as will be apparent from the following relationships.

Volumetric rate of flow Q, may be expressed as:

$$Q = KV \quad (8)$$

where K is a constant dependent upon the cross-sectional area of the conduit and V is the velocity of the fluid through the conduit.

If expression (5) for the $\Delta P$ measured across the vortex is divided by the independent density indication D, we obtain the following:

$$\frac{K_3 D \omega^2}{KD} = K_5 \omega^2 \quad (9)$$

But $\omega = K_1 V$ (Equation 2, therefore $$\frac{K_3 D \omega^2}{KD} = K_6 V^2 \qquad (10)$$

Taking the square root of the right hand term of Equation 10 gives the quantity $$KV \qquad (11)$$

which is the volumetric flow rate Q of expression (8).

To derive this indication directly, the indicator 38 may be suitably calibrated, or the square root may be calculated by the observer.

As has been indicated above, the vane members 16 and 46 in FIGURES 1 and 2 respectively, have been shown for ease of illustration as single, continuous, curved surfaces. Although such vane members are suitable in many applications, it has been found that further improvements in operation may be achieved by providing a plurality of such surfaces interleaved with each other in the manner of a multiple thread screw, as shown in FIGURE 3.

Referring now to that figure, a hub 50 having a streamlined nose at its upstream end is maintained coaxially within the conduit 10 by means of a plurality of helical vane surfaces 52, 54. As in the case of FIGURES 1 and 2, the vane elements are fixed to or integral with the hub 50 and are secured to the inner surface of the conduit 10 along their outer edges. Although two such vane elements are pictured, three, four or even more may be used, the greater the number the more efficiently vortex flow is obtained.

The helix angle of the vane elements is also made to increase gradually from substantially 0° (i.e. parallel to the direction of flow) at its input end, to an angle approaching 90°. This allows the conversion from linear flow to vortex flow to be achieved with a minimum of turbulence and pressure loss.

Figure 3:
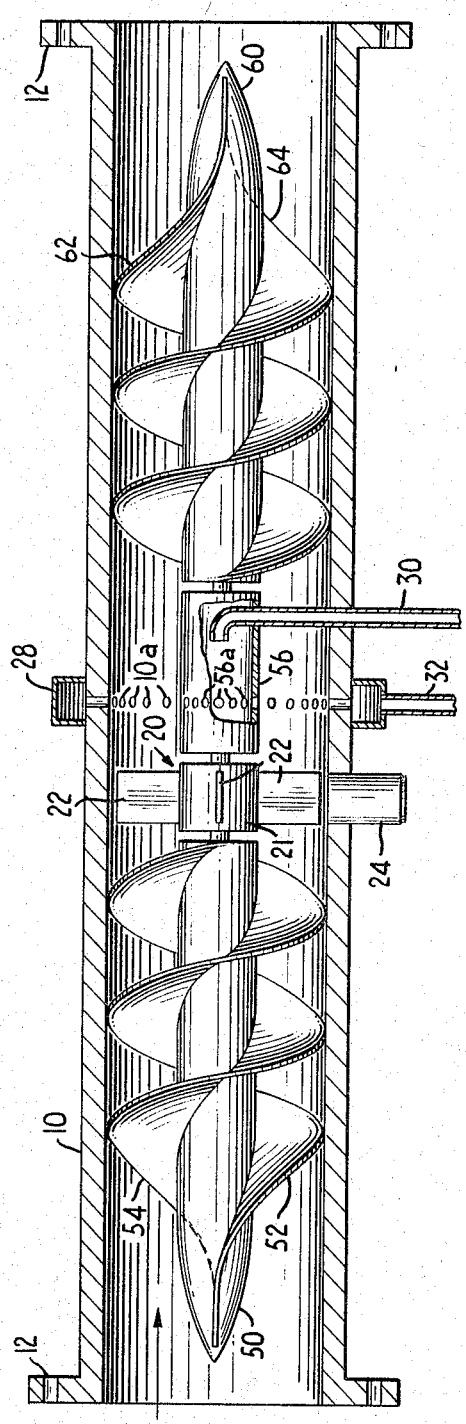
FIGURE 3 is a partial cross section through another form of apparatus according to the invention illustrating an alternate form of helical vane means.

The embodiment of FIGURE 3 may also include velocity and ΔP measuring elements similar to those of FIGURE 1, as indicated by corresponding reference numerals in the drawing. It differs therefrom, however, in including a second hub member 60 downstream of the ΔP measurement section. The latter hub 60 is provided with a plurality of helical vane surfaces 62, 64 similar to surface 52, 54 on hub 50, but decreasing in helix angle towards the downstream end. The hollow member 56 inside of which the pressure at the center of the vortex is obtained, and the rotor support 21 are preferably of the same diameter as the hubs 50 and 60 and assembled to provide a minimum of disturbance to the flow of fluid.

Although as is evident from the embodiment of FIGURE 1, the additional hub 60 and vanes 62, 64 are not necessary to obtain the desired flow measurements, they serve to "unwind" the vortex flow and reconvert it to linear flow with a minimum of energy loss. Accordingly, in those applications where only minimal pressure drops can be tolerated, the embodiment of FIGURE 3 is preferable. It will of course be recognized that the vane configuration of FIGURE 3 may also be used with the embodiment of FIGURE 2.

It will be seen from the foregoing that the present invention provides a simple and reliable method and apparatus for measuring mass or volumetric flow rate of fluids using a minimum of apparatus and providing relatively little interference with the flow of fluid. The vortex flow technique of obtaining the quantity proportional to density and velocity (Equation 5) provides greater accuracy than is obtainable with nozzles, venturis, or orifices. With vortex flow the density across the vortex is constant and the expansion factor in compressible fluids may be disregarded. Moreover, since a centrifugal force is being measured, coefficients of discharge due to boundary layer effects, or cross-sectional area changes are of negligible importance. Thus the ΔP measuring technique and apparatus of the present invention may be used with advantage in place of these other devices.

It will be obvious to those skilled in the art that various modifications may be made in the method and apparatus described herein without departing from the spirit and scope of the invention. Accordingly, the invention should be limited only as set forth in the appended claims.

I claim:

1. Apparatus for measuring the rate of flow of fluid through a conduit comprising an elongated hub member, helical vane means secured to and disposed about the peripheral surface of said hub member, the outer edges of said vane means being secured to the inner surface of said conduit, whereby said hub member and vane means are fixed within said conduit substantially axially thereof, and means interposed at a point along said hub member intermediate sections of said vane means for measuring the difference in pressure between the axis and inner wall of said conduit, the helix angle of the section of said vane means upstream of said pressure difference measuring means increasing from substantially parallel to the axis of the conduit to a substantial angle with respect thereto and the helix angle of the section of said vane means downstream of said pressure difference measuring means decreasing from a substantial angle to the axis of the conduit to substantially parallel thereto.

2. Apparatus according to claim 1 wherein said pressure difference measuring means is interposed between a point substantially coaxial of said conduit and the point substantially at the outer periphery of said conduit for measuring the difference in pressure across said vortex, both said points lying in a plane substantially perpendicular to the axis of said conduit, said pressure difference being related to the density of the fluid flowing in said conduit section.

3. Apparatus for measuring the mass flow rate of fluid through a conduit comprising an elongated hub member, helical vane means secured to and disposed about the peripheral surface of said hub member, the outer edges of said vane means being secured to the inner surface of said conduit, whereby said hub member and vane means are fixed within said conduit substantially axially thereof, rotatable paddle means interposed at a first position along said hub member intermediate sections of said vane means mounted coaxially of said conduit section and responsive to the angular fluid flow to provide a measurement of the velocity of the flow of fluid through said conduit section and means interposed at a second position along said hub member intermediate sections of said vane means for measuring the difference in pressure between the axis and inner wall of said conduit, said pressure difference being related to the density of the fluid flowing in said conduit section, the helix angle of the section of said vane means upstream of said pressure difference measuring means increasing from substantially parallel to the axis of the conduit to a substantial angle with respect thereto and the helix angle of the section of said vane means downstream of said pressure difference measuring means decreasing from a substantial angle to the axis of the conduit to substantially parallel thereto.

4. Apparatus according to claim 3 wherein said pressure difference measuring means is interposed between a point substantially coaxial of said conduit and a point substantially at the outer periphery of said conduit, adjacent said rotatable vane means, both said points lying in a plane substantially perpendicular to the axis of said conduit section, said pressure difference being related to the density of the fluid flowing in said conduit section.

5. Apparatus according to claim 4 further comprising means to divide said pressure difference measurement by said velocity measurement to obtain a quotient proportional to the mass flow rate through said conduit.

(References on following page)

References Cited by the Examiner

UNITED STATES PATENTS

| | | | |
|---|---|---|---|
| 2,146,827 | 2/1939 | Kruspi | 73—198 |
| 2,772,567 | 12/1956 | Boden et al. | 73—231 |
| 2,826,913 | 3/1958 | Rosenberger | 73—205 |
| 2,975,635 | 3/1961 | Kindler et al. | 73—194 |
| 3,144,768 | 8/1964 | Gehre | 73—229 X |
| 3,153,341 | 10/1964 | Spalding et al. | 73—231 |
| 3,164,017 | 1/1965 | Karlby et al. | 73—231 |
| 3,240,063 | 3/1966 | Brueckner | 73—231 |

FOREIGN PATENTS

| | | |
|---|---|---|
| 704,894 | 3/1931 | France. |
| 1,349,569 | 12/1963 | France. |

RICHARD C. QUEISSER, *Primary Examiner.*

JAMES J. GILL, *Examiner.*

E. D. GILHOOLY, *Assistant Examiner.*